United States Patent
Radatti et al.

(10) Patent No.: US 7,716,736 B2
(45) Date of Patent: May 11, 2010

(54) APPARATUS, METHODS AND ARTICLES OF MANUFACTURE FOR COMPUTER VIRUS TESTING

(75) Inventors: Peter V. Radatti, Conshohocken, PA (US); Richard J. Perry, Drexel Hill, PA (US)

(73) Assignee: Cybersoft, Inc., Conshohocken, PA (US)

( * ) Notice: Subject to any disclaimer, the term of this patent is extended or adjusted under 35 U.S.C. 154(b) by 1024 days.

(21) Appl. No.: 10/418,028

(22) Filed: Apr. 17, 2003

(65) Prior Publication Data

US 2004/0210769 A1 Oct. 21, 2004

(51) Int. Cl.
*G06F 11/30* (2006.01)
*G06F 11/00* (2006.01)

(52) U.S. Cl. .................. 726/22; 726/23; 726/24; 713/187; 713/188

(58) Field of Classification Search .................. 713/188, 713/181, 187; 726/24, 22, 23
See application file for complete search history.

(56) References Cited

U.S. PATENT DOCUMENTS

| | | | | |
|---|---|---|---|---|
| 5,758,165 A * | 5/1998 | Shuff | .................. | 717/178 |
| 5,832,208 A * | 11/1998 | Chen et al. | .................. | 726/24 |
| 5,889,948 A * | 3/1999 | Smolansky et al. | .................. | 709/213 |
| 6,195,587 B1 * | 2/2001 | Hruska et al. | .................. | 700/2 |
| 6,253,324 B1 * | 6/2001 | Field et al. | .................. | 713/187 |
| 6,665,626 B2 * | 12/2003 | Hsieh et al. | .................. | 702/108 |
| 6,697,948 B1 * | 2/2004 | Rabin et al. | .................. | 726/30 |
| 6,785,732 B1 * | 8/2004 | Bates et al. | .................. | 709/232 |
| 6,792,517 B1 * | 9/2004 | Brunnett et al. | .................. | 711/162 |
| 6,901,519 B1 * | 5/2005 | Stewart et al. | .................. | 726/24 |
| 6,931,552 B2 * | 8/2005 | Pritchard et al. | .................. | 726/34 |
| 6,963,978 B1 * | 11/2005 | Muttik et al. | .................. | 713/188 |
| 7,020,895 B2 * | 3/2006 | Albrecht | .................. | 726/22 |
| 7,152,164 B1 * | 12/2006 | Loukas | .................. | 713/188 |
| 7,363,657 B2 * | 4/2008 | Caccavale | .................. | 726/24 |
| 2001/0005889 A1 * | 6/2001 | Albrecht | .................. | 713/201 |
| 2002/0007453 A1 * | 1/2002 | Nemovicher | .................. | 713/155 |
| 2003/0023866 A1 * | 1/2003 | Hinchliffe et al. | .................. | 713/200 |
| 2003/0093238 A1 * | 5/2003 | Hsieh et al. | .................. | 702/121 |
| 2004/0098414 A1 * | 5/2004 | Chan et al. | .................. | 707/200 |
| 2004/0123117 A1 * | 6/2004 | Berger | .................. | 713/188 |
| 2004/0133520 A1 * | 7/2004 | Callas et al. | .................. | 705/51 |
| 2004/0133774 A1 * | 7/2004 | Callas et al. | .................. | 713/153 |
| 2005/0027988 A1 * | 2/2005 | Bodrov | .................. | 713/176 |

* cited by examiner

*Primary Examiner*—Nasser Moazzami
*Assistant Examiner*—Mohammad W Reza
(74) *Attorney, Agent, or Firm*—Frank J. Bonini, Jr.; John. F. A. Earley, III; Harding, Earley, Follmer & Frailey, P.C.

(57) ABSTRACT

The present invention comprises apparatus, methods and articles of manufacture for computer virus testing in a networked environment. A host is provided that permits uploading of suspected files by a user. The are transferred to a server, where they are scanned for the presence of known virii. The files are then run, in an appropriate operating environment, separate from the operating system of the server, and the results compared to and noted against a reference. Any modified files are logged, as is any output. The user is notified as to the results, and in some embodiments, the lists of modified files are made available to various users.

26 Claims, 1 Drawing Sheet ively be

APPARATUS, METHODS AND ARTICLES OF MANUFACTURE FOR COMPUTER VIRUS TESTING

FIELD OF THE INVENTION

The present invention relates to computer virus testing. More specifically, the present invention relates to computer virus testing in a networked environment.

BACKGROUND OF THE INVENTION

There is little ability for a user to test for the presence of a suspected, yet unknown, virus in a file until the virus has been identified by a virus laboratory, its code noted, and a database of the code disseminated to computer users via an antivirus program database.

One method of attempting to identify suspected, yet unknown virii is to provide a scanning service, to a user, through an Application Service Provider ("ASP.")

An ASP, whether through the Internet or other networks, may assist in resolving some testing issues. For example, the ASP may minimize the need for testing by the user by providing a constantly updated database. An ASP might also provide a testing method for suspected, yet unknown virii by having the user send his or her email to a server for virus scanning, through an open relay. In other words, email is sent to a server and the server scans the email and then forwards the email according to its address. The problem with this method is that open relay mail servers may be attacked, such as might be the case for example when an open relay email server is hacked to provide unsolicited bulk email (UBE) or hacked in order to be used as a denial of service (DOS) platform. Thus an open relay method may be unacceptable.

Another method is to allow users to send email to the server which is then processed and returned to the sender. However, this method may also be unacceptable because of interception possibilities. For example, a malicious user could surreptitiously install a program on the server that allows the interception of email, forging of email, etc.

Accordingly, there exists a need for improved apparatus, methods and articles of manufacture for computer virus testing.

SUMMARY OF THE INVENTION

The present invention comprises apparatus, methods and articles of manufacture for computer virus testing in a networked environment. In the preferred embodiments, a web host is provided that permits uploading of suspected files. The files are run, in an appropriate operating environment, and the results noted against a reference. The user is notified as to the results, and in some embodiments, the lists of modified files are made available to various users.

DETAILED DESCRIPTION OF THE PREFERRED EMBODIMENTS

Figure 1:
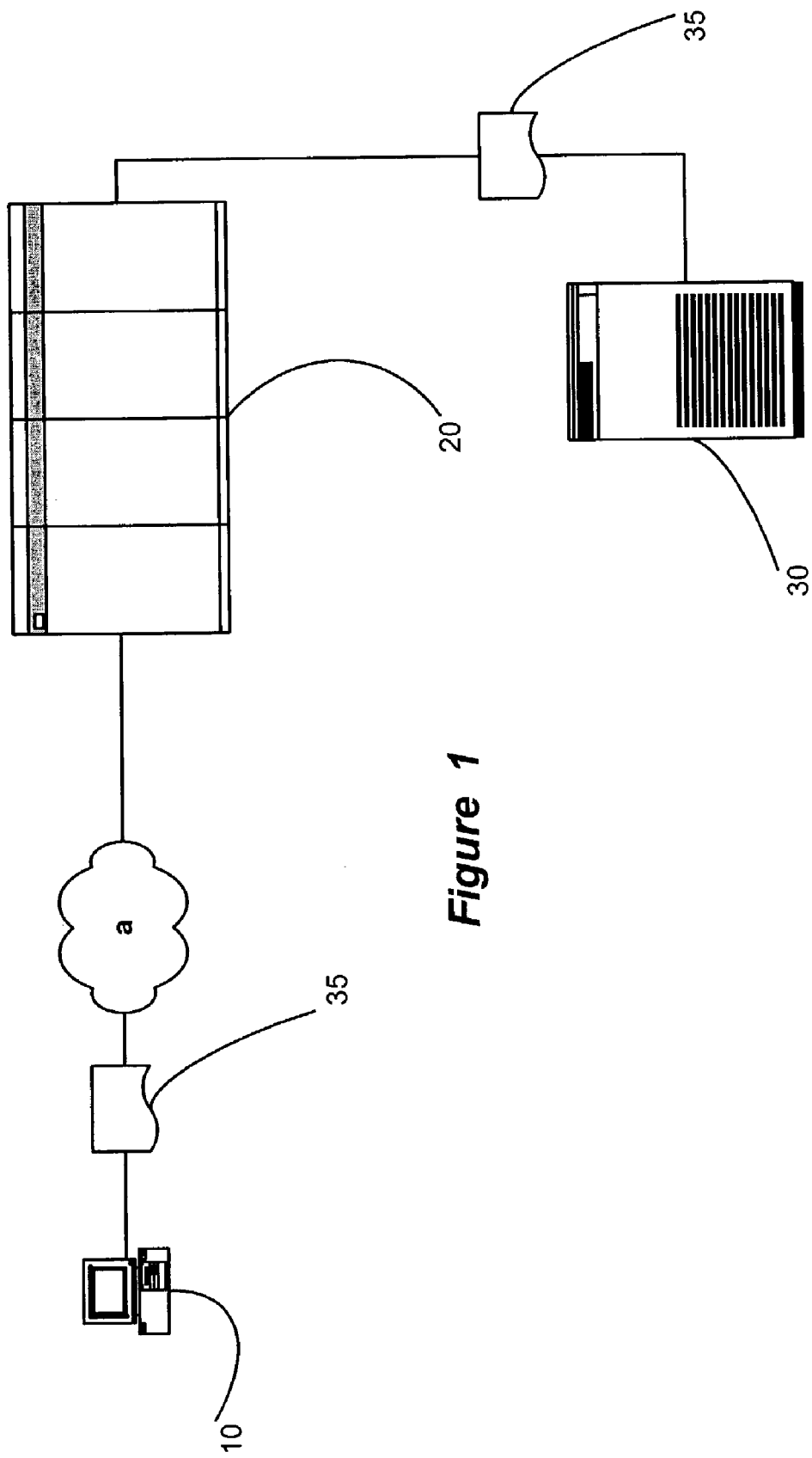
FIG. 1 shows a preferred embodiment.

The present invention comprises apparatus, methods and articles of manufacture for computer file testing in a networked environment. "File" as used herein generally includes data, code, computer software, audio, video, telemetry, data, and database objects. The especially preferred embodiments test for potential computer viruses in a networked environment. (It should be noted that "virus" and its variants, as used herein includes but is not limited to hostile, malicious, predetermined and/or proscribed code, and also may be referred to herein "proscribed code.")

Although the present invention can be implemented on any platform known in the art, the preferred embodiments are used in Unix® and various Windows environments, such as XP, NT, 2000, 95, 98 and Me, as well as other Unix® and Unix®-like platforms, including System V, Sun Solaris®, IBM AIX®, HP-UX®, Linux® and its variants, as well as other operating environments including but not limited to IBM OS/390, MacOS, VxWorks® and others. Moreover, those skilled in the art will appreciate that the invention may be practiced with other electronic device and computer system configurations, including hand-held devices, cell phones and other wired and wireless communication devices, digital audio and video devices, distributed computing environments, multi-processor systems, and microprocessor-based or programmable consumer electronics, such as smart printers, network PCs, minicomputers, mainframe computers, and the like.

A preferred embodiment of the present invention is shown at FIG. 1. User 10 logs on to web host 20 through network a. In the preferred embodiments, network a is the Internet, however in other embodiments, an Intranet, a WAN, LAN, etc. may be used and a host may be appropriately configured.

The log on interface is password protected with a password database. A second, separate password database is used for download privileges. This enables users to selectively be given download-only or download-and-upload privileges. In other embodiments, of course, types of privileges and methods of granting those privileges may be varied. Additionally, it may be desired in yet other embodiments to permit any user access to the system of the embodiment, as for example when providing access to the system for test or promotional purposes. Additionally, if as is the case in some embodiments, other methods besides or in addition to web host access are utilized to transfer files (e.g., email, instant messaging, etc.) a password or other access key may be necessary in the headers or body of the message.

Returning now to the embodiment of FIG. 1, after log on, the user uploads the file 35 that the user wants to test to web host 20. In other embodiments, uploading or sample transfer may be on an automatic or some other predetermined basis. Moreover, transfer may be from a program as well as from a user, such as for example a plug in from an email server to a testing system. In the preferred embodiments, samples may be accepted in any desired format, e.g. .exe files, .doc files, zip or compressed tar archives, mail files, sendmail queue files, etc. As will be further described below, in the preferred embodiments, a user progress page will also be available on the web host, so that the user may check the progress of his or her particular sample. In other embodiments, progress and/or results of the testing may be supplied in other manners, e.g., email, instant messaging, file transfers, etc. For example, the output may be supplied to another program for further use and/or reporting, to a database, etc.

Once web host 20 receives proscribed code 35, it transfers the code to server 30. Server 30 in the preferred embodiments, contains an analysis operating environment, e.g. UNIX, as is further described below. In other embodiments, a server may be linked to an analysis operating environment.

Returning to FIG. 1, server 30 deconstructs, as necessary, any samples, using tools such as CyberSoft Inc.'s UAD. For example, if a zip file has been submitted, server 30 will deconstruct the zip file into its various components. Once the file has been deconstructed into its various components, any executables or other possible proscribed code files may be reviewed for known viruses or other proscribed code, using a tool such as CyberSoft Inc.'s VFIND. It should be noted that the type of file to be reviewed for proscribed code scanning may be set in a predetermined manner, e.g. exe files, or set according to system variables, user's variables, and/or other methods.

It is also possible, in other embodiments, that only specifically formatted samples may be accepted and/or reviewed (e.g. Word files, .exe files, etc.)

If the extracted files reveal the presence of one or more known virii, the user may be notified in any of a number of ways, through a web page update, email (e.g. "Warning—The sample you have sent is infected with the XX virus,") etc. as is further described below. Processing will continue in the preferred embodiments, however, as both known and unknown virii may be present in the same sample.

The extracted file(s) is renamed with a unique serial number, which may be generated, for example, by an MD5 hash of the file. A duplicate check may desirably be first run, so as to prevent using resources on files that have already been checked. For example, in an enterprise environment, a number of users may submit copies of the same possibly suspect files to the server. Thus once one of the copies is checked, others need not be, and so those would be returned with the appropriate data to the user as is further described below. Duplicate checking is done in the preferred embodiments by checking the serial number against a database of hashes. It should be noted that it may be desired to rerun duplicate files in some instances, by way of an override or other mechanism.

The file, with its new name, is moved to an input queue. Access to the queue is serialized by a locking mechanism so that only one process at a time can add or remove samples from the queue. Each file is then taken from the queue and processed.

The file is first moved to a directory created with same name as the file serial number, and the user's progress web page is updated with a Current run indicator, which is linked to the current file run directory. In the preferred embodiment a LOG file or other record is made available on the web page for the user, although other embodiments may use different mechanisms. Thus a user is made dynamically aware of the results of the test. Of course, other methods of notification may be used as well, such as email, instant messaging, etc.

A copy_disk_image is created for each file as it is removed from the queue. In the preferred embodiments, this disk image is kept separate from the server. For example, a SUN PCi card may be used to create a Windows run time environment as will further described below. This copy_disk_image is created in the preferred embodiments by copying a preexisting Windows installation on the server to a new UNIX directory and mounting the new directory as a disk (e.g., R:). While copy_disk_image may then be run as a Windows environment, its directory is also accessible to a UNIX environment as will be further described below. The existing installation, it should be noted, has itself been referenced, in a reference_disk_image, so that its files are known, as the reference files will be compared against possible proscribed code altered files, as will be further described below.

In other embodiments, other control may be used to examine the effects of the sample on the system. For example, an in circuit emulation, step through process, etc. may be used so the effect of the sample on the operating environment may be ascertained.

This copy_disk_image will serve as the "goat" or environment which will test the file. The file to be checked is transferred to the copy_disk_image, and the disk image mounted and run. In the preferred embodiments, this means that a DOS environment will then be created for copy_disk_image to boot and run Windows. Of course, other environments may be created as desired.

copy_disk_image is configured so as to allow capture of output, e.g. network transmissions, external system requests, email, etc. In the preferred embodiments, this capture is done by providing a connection to a single server only, such as providing a preconfigured DNS server to be used by the disk. In other embodiments, multiple servers may be used for configuration and/or capture. The preconfigured DNS server maps all forward and reverse DNS lookups to the server itself, where they are trapped inside a directory and maintained for further analysis. A preconfigured mail server is also provided on the server which will receive mail from copy_disk_image and save the mail in a queue for further analysis. So, for example, if a virus embedded in the file run on copy_disk_image attempts to send mail using SMTP server smtp.yahoo.com, the SMTP connection will actually go to the preconfigured mail server instead of yahoo.

The startup of copy_disk_image creates a "PC" on a SunPCi card in the especially preferred embodiments. Proscribed code run processing starts by acquiring a lock on the PC, since a SunPCi card can only be used by one process at a time. In other words, access to run the PC is serialized by a locking mechanism similar to the input queue locking. The PC will run for a predetermined amount of time. Various processes are also run in order to capture information from the PC. Each process can be run as desired and/or automatically, e.g. at predetermined intervals, such as one or two minutes. For example, in an especially preferred embodiment, the following processes, at the following intervals, might be run:

A network snoop process may be started to capture all network packets associated with the PC into a file. The process proceeds for two minutes.

A network strobe process may be started to check for open TCP ports on the PC. The process proceeds for one minute.

A screen snapshot is made at two minutes.

After the predetermined run time, the PC is shut down. If the operating environment cannot be shut down cleanly, the shut down environment state is logged. Any output data and/or files are logged or otherwise processed as desired. For example, a network snoop file would be processed to create a text list of packets and sorted count of source/destination IPs and packet types. For example, any mail which was generated and queued during the run is moved from the captured sendmail queue into the sample's run mqueue subdirectory, present in the (home/[virus_file_number]/) directory. It should be noted that applications may be run as well within an operating environment. For example, in a Windows environment, if an Office application such as Word may be run as well, in order to test a Word uploaded file containing VBA or macro code the output of the application is included in any analysis.

A copying process is then started whereby the copy_disk_image, which is now altered after the possible proscribed code run, is copied into an appropriate directory, e.g., /user2/[virus_file_number] directory. In the preferred embodiments, this is a restricted directory in order to isolate any effects of the virus. The files in copy_disk_image are reviewed for the presence of proscribed code in that directory, using a proscribed code scanner such as CyberSoft's VFIND.

The list of files contained in copy_disk_image, comprising a first file set, is also compared with a list of files from reference_disk_image, comprising a reference file set, to produce lists of files that have been altered, deleted, added, etc. Additionally, files which appear in both lists may be noted, as well as any other file information deemed desirable. Certain files may also be eliminated from the comparison according to user parameters and/or as further described below (for example, files which are usually added and/or created by booting and/or running an operating environment.)

A file report is generated in the preferred embodiment. Configuration of the report may be according to user preference, and/or according to predefined configurations. For example, a report may list any files which have proscribed code present, a summary of any output, (e.g. network, email activity, etc.) any desired screen snapshots, a list of the files contained in copy_disk_image after running the virus, a list of a comparison of files in copy_disk_image against reference_disk_image, etc.

This file list is then returned to the web host, and posted on the user's web page for reference. Any output may be posted as well. In the especially preferred embodiments, this takes the form of a report.html file and is created with links to the run log, screen snapshots, virus code, infected and clean files, mail queue files, etc. Additionally, the actual infected files may be made available as well, such as through a "zip archive" link which enables download of the entire collection of files associated with a virus.

Additionally any suspect files that have been identified may, along with their reference versions, from reference_disk_image, be archived for later analysis.

It should be noted that modifications to copy_disk_image may be expected due to booting and/or running an operating environment. So, for example, with Windows, SYSTEM.DAT may be modified by Windows every time it is booted. Therefore, in the preferred embodiments, a separate list of files normally created and/or modified by an operating environment may be maintained in a baseline log file, and any changes to the files retained in the baseline log file would be ignored when comparing the infected copy_disk_image to reference_disk_image.

Returning now to the especially preferred embodiments, it may be desired to create signatures of any tested files as well. For example, if proscribed code is detected because it has exercised undesired effects on the copy_disk_image, a proscribed code signature may be created. File signatures may be created through a number of methods. One especially preferred method is to use a tool such as CyberSoft's VFIND program to extract the first 70 bytes of the entry-point code from the sample and any modified and/or infected executable files from the run. The entry-point code is then merged using a fuzzy intersection algorithm to produce a VDL signature suitable for use with VFind. A similar method may also be used for file signatures, that is, those files that do not contain proscribed code but other meaningful data and/or results on the testing environment.

It should be noted that one or more systems may be used to process files as noted above. Thus one or more servers may be used to feed one or more web hosts, one or more systems may run analysis, transfer files, analyze and/or compare results, etc.

In yet other embodiments, test runs can be destroyed on a periodic basis such as nightly, weekly or if a specific event takes place. For example, if the demonstration system runs out of disk space it could trigger destruction of older test results thereby freeing space.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. A method of computer virus testing in a networked environment comprising:
   providing a server in a networked environment;
   providing a client in said networked environment containing at least one file for uploading;
   providing a first operating environment on said server configured to run applications corresponding to said at least one file for uploading in order to test said at least one file for uploading;
   receiving an uploaded file on said server, said uploaded file comprising said file for uploading, including wherein as the file is uploaded, renaming the file by assigning a unique serial number to represent the name of the file, wherein the unique serial number is based on a hash of said uploaded file;
   executing said uploaded file in said first operating environment and thereby obtaining a first file set;
   comparing said first file set to a reference file set in a second operating environment, said second operating environment comprising an operating environment which is separate from said first operating environment and which is the same or different than said first operating environment with respect to the type of applications that are capable of being run in said second operating environment; and,
   providing the results of said comparison;
   wherein the step of executing said uploaded file in said first operating environment includes capturing the output of network requests and external system requests that are made upon execution of said file;
   further comprising capturing any output from said execution and storing said captured output in a directory which may be accessed for further analysis of said captured output; and
   wherein the step of capturing output from said execution includes creating a copy_disk_image.

2. A method as in claim 1 further comprising scanning said file for a known virus.

3. A method as in claim 1 wherein receiving an uploaded file on means for receiving an uploaded file comprises receiving an uploaded file to a host, and wherein said receiving an uploaded file to a host further comprises receiving an uploaded file and transferring said file to a server from said host.

4. A method as in claim 1 further comprising scanning said first file set for proscribed code.

5. A method as in claim 1 wherein said comparing said first file set to a reference file set in a second operating environment further comprises identifying any created or modified files.

6. A method as in claim 1 wherein said providing the results of said comparison further comprises selecting results to be provided from the group consisting of: any files which have proscribed code present, a summary of any network and email activity, any desired screen snapshots, a list of the files contained in a first file set after running a virus, and, a list of a comparison of files in a first file set against a reference file set.

7. A method as in claim 1, further comprising providing a log of any such output.

8. A method as in claim 1, wherein capturing said output to be provided further comprises capturing said output from the group consisting of network transmissions, external system requests, and email.

9. A method as in claim 1 wherein said first operating environment and said second operating environment are different operating environments.

10. A method as in claim 1 wherein said first operating environment and said second operating environment are the same operating environments.

11. A method as in claim 9 wherein said second operating environment is a UNIX environment.

12. A method as in claim 9 wherein said second operating environment is a LINUX environment.

13. A method as in claim 1 wherein said first operating environment is a Windows environment.

14. A method as in claim 4 wherein said scanning said first file set for proscribed code further comprises creating signatures of any proscribed code.

15. A method as in claim 1 further comprising: receiving a second uploaded file; executing said file in a third operating environment and thereby obtaining a second file set; comparing said second file set to a second reference file set in said second operating environment; and, providing the results of said comparison.

16. The method of claim 1, wherein at least one of said first operating environment and said second operating environment corresponds to an operating environment configured to run said uploaded file, the first operating environment is a different operating environment than said second operating environment, and analyzing the viral effects of the file that is run in said at least one operating environment as the file is being run.

17. The method of claim 1, wherein executing the file in said first operating environment includes executing the file in a step through process and wherein comparing said first file set includes determining the effects of the file on the said operating environment in which said file is run.

18. The method of claim 17, wherein said second operating environment which is separate from said first operating environment and is different in terms of the applications which may be run in said first environment and in said second environment.

19. The method of claim 1, further comprising providing a dynamically associated user progress page that displays the status of the progress of the file testing.

20. An apparatus for computer virus testing in a networked environment comprising: a server configured with a first operating environment and a second operating environment; means for receiving an uploaded file, said means for receiving including renaming means wherein as the file is uploaded said means for receiving renames the file by assigning a unique serial number to represent the name of the file, wherein the unique serial number is based on a hash of said uploaded file; said server comprising means for executing said file in said first operating environment and thereby obtaining a first file set; means for comparing said first file set to a reference file set in a second operating environment; and, means for providing the results of said comparison, said first operating environment being separate from said second operating environment;
further comprising means for capturing any output from said execution and storing said captured output in a directory which may be accessed for further analysis of said captured output; and
wherein the means for capturing output from said execution includes means for creating a copy_disk_image.

21. An apparatus as in claim 20 further comprising means for scanning said file for a known virus.

22. An apparatus as in claim 20 further comprising means for scanning said first file set for proscribed code.

23. An apparatus as in claim 20 further comprising means for providing a log of any such output.

24. An article of manufacture for transforming data comprising at least one computing component that has computer storage media that implements code for generating a signature by scanning a first file set for proscribed code, said computer storage media further implementing code for obtaining a first file set by receiving an uploaded file, and, executing said file in a first operating environment, wherein a copy_disk_image is provided on a server to serve as said first operating environment, and wherein the step of executing said uploaded file in said first operating environment includes capturing the output of network requests and external system requests that are made upon execution of said file, wherein said first operating environment comprises an operating environment of that of said uploaded file;
wherein said storage media implements code for capturing any output from said execution and storing said captured output in a directory which may be accessed for further analysis of said captured output;
wherein said code implemented for obtaining a first file set by receiving an uploaded file further comprises code that implements renaming the file by assigning a unique serial number to represent the name of the file, wherein the unique serial number is based on a hash of said uploaded file;
wherein said computer storage media implements code for capturing output from said execution that includes creating a copy_disk_image.

25. An article of manufacture for transforming data comprising at least one computing component that has computer storage media that implements code for: receiving an uploaded file; executing said file in a first operating environment and thereby obtaining a first file set; comparing said first file set to a reference file set in a second operating environment, said first operating environment being separate from said second operating environment;
wherein said storage media implements code for capturing any output from said execution and storing said captured output in a directory which may be accessed for further analysis of said captured output;
wherein said code further implements renaming of said file by assigning a unique serial number to represent the name of the file, wherein the unique serial number is based on a hash of said uploaded file; and
wherein said computer storage media implements code for capturing output from said execution that includes creating a copy_disk_image.

26. A method of computer virus testing in a networked environment comprising:
providing a server;
providing a client containing at least one file for uploading, said client comprising a client application operating environment;
providing a first operating environment on said server configured to run applications corresponding to said at least one file for uploading in order to test said at least one file for uploading;
receiving an uploaded file on said server, said uploaded file comprising said file for uploading, including wherein as the file is uploaded, renaming the file by assigning a unique serial number to represent the name of the file, wherein the unique serial number is based on a hash of said uploaded file;

executing said uploaded file in said first operating environment to generate execution results and obtaining a first file set comprising said execution results of said file execution in said first operating environment of said server;

comparing said first file set to a reference file set in a second operating environment, said second operating environment comprising an operating environment which is separate from said first operating environment and which is the same or different than said first operating environment with respect to the type of applications that may be run in said second operating environment; and, providing the results of said comparison, wherein the step of executing said uploaded file in said first operating environment includes capturing the output of network requests and external system requests that are made upon execution of said file;

further comprising capturing any output from said execution and storing said captured output in a directory which may be accessed for further analysis of said captured output; and wherein the step of capturing output from said execution includes creating a copy_disk_image.

* * * * *